United States Patent [19]

Hvolka

[11] Patent Number: 5,082,082
[45] Date of Patent: Jan. 21, 1992

[54] MULTI-PURPOSE SERVICE VEHICLE

[75] Inventor: Dusan J Hvolka, Salt Lake City, Utah

[73] Assignee: DJH Engineering Center, Inc., Salt Lake City, Utah

[21] Appl. No.: 568,767

[22] Filed: Aug. 17, 1990

Related U.S. Application Data

[63] Continuation-in-part of Ser. No. 359,277, May 31, 1989, which is a continuation-in-part of Ser. No. 140,671, Jan. 4, 1988.

[51] Int. Cl.$^5$ ............................................. B62D 33/00
[52] U.S. Cl. .................................. 180/234; 180/311; 296/183; 296/197
[58] Field of Search ............... 296/197, 183; 180/89.1, 180/234, 311, 312, 317, 904

[56] References Cited

U.S. PATENT DOCUMENTS

| | | | |
|---|---|---|---|
| 3,520,429 | 7/1970 | Andersson | 414/421 |
| 3,727,938 | 4/1973 | Goodbary et al. | 180/234 X |
| 3,877,717 | 4/1975 | Swoager | 180/234 X |
| 3,905,498 | 9/1975 | van der Lely | 414/546 |
| 4,556,356 | 12/1985 | Niva | 414/458 |
| 4,950,121 | 9/1990 | Meyer et al. | 180/904 |

FOREIGN PATENT DOCUMENTS

| | | | |
|---|---|---|---|
| 2236695 | 10/1987 | Japan | 901/47 |
| 1059656 | 2/1967 | United Kingdom | 414/565 |

Primary Examiner—Charles A. Marmor
Assistant Examiner—Victor E. Johnson
Attorney, Agent, or Firm—Marcus G. Theodore

[57] ABSTRACT

A U-shaped multi-purpose service vehicle particularly adapted for transport and hauling comprising: A U-shaped frame having opposing sides and front ends connected by a front piece, and rear ends defining an open interior space in communication with an open front end; wheel mounts capable of pivoting attached to the opposing sides; a plurality of wheels independently suspended and rotatably attached to the wheel mounts; pivot means associated with the wheel mounts to pivot and turn each wheel in a desired direction; independent drive means associated with each wheel to rotate said wheels forward and backward; a power source operably associated with the pivot means and independent drive means; and control means mounted to the frame and associated with the drive means, pivot means, and power source to selectively activate the drive means and pivot means to align and drive each wheel at the desired speed and direction.

16 Claims, 7 Drawing Sheets

MULTI-PURPOSE SERVICE VEHICLE

RELATED APPLICATIONS

This application is a continuation-in-part of the continuation-in-part application U.S. patent application Ser. No. 359,277, filed May 31, 1989 entitled "Multi-Purpose Vehicle" of the originally filed U.S. patent application, Ser. No. 140,671, filed Jan. 4, 1988 entitled "Multi-Purpose Vehicle".

BACKGROUND OF THE INVENTION

1. Field

This invention relates to multi-purpose vehicles. Specifically, it related to an improved light weight, highly efficient U-shaped multi-purpose service vehicle particularly adapted for airport, digging, and surface transport applications.

2. State of the Art

Numerous multi-purpose vehicles are known. These vehicles typically employ an X-shaped, or box-shaped frame with a conventional cab on the front, and a cabin or bed attached along the length of the frame, such as the amphibious vehicle designed by Fletcher et al., U.S. Pat. No. 2,923,268. Generally, the conventional multi-purpose vehicle has forward steering wheels and rear drive wheels. When pulling heavy objects, a number of conventional vehicles may be harnessed together in series. This requires a long pulling space to accommodate the aligned vehicles connected in series. These harnessed vehicles are also difficult to turn and cause the rear vehicles to run in the tracks left by the forward vehicles; often times resulting in poor traction of the trailing vehicles. The aligned vehicles, when harnessed, generally move in a longitudinal direction. Non-pivoting wheels of conventional vehicles do not allow significant sideward movement, which makes it necessary to uncoupled and recouple the vehicles when it is necessary to move the load laterally.

To shorten the turning radius of conventional vehicles, articulated vehicles, such as those described in Hutt, U.S. Pat. No. 4,249,629, and Domenighetti, U.S. Pat. No. 2,914,065 have been utilized. In other applications, a series of carts pulled by a main drive vehicle may be employed, such as the Fire Fighting and Rescue Apparatus described by P. F. Cummins, U.S. Pat. No. 2,169,581. Although these articulated vehicles enable a series of harnessed vehicles to turn in a shorter radius, they do not solve the problem of the rear aligned vehicle's poorer traction as it travels in the same tracks left by the forward vehicles.

The confined working space in underground mines also requires compactness in self loading hauler (SLH) vehicle designs. As a result, SLH vehicles tend to have a length slightly greater than a light hauling vehicle. The excessive length is tolerable in a majority of underground operations since the drifts (tunnels) are long in comparison and have a narrow width and low height. The excessive length of the SLH contributed to counter-balancing the oversized payloads. However, the narrow width complicates turning and side slope stability. This requires judicious design of the basic frame structure and the location of the components within it. Low height is not only desirable from an operating stand-point, but is also necessary in order to improve the stability of the SLH.

British Patent 1,203,338 incorporates a conveyor assembly running the length of the bed. It therefore is of a box-like shape rather than a U-shaped vehicle which can nest or interconnect for pulling and pushing articles. British Patent No. 1,059,656 uses a flexible articulated frame shown in FIG. 5, which lifts and bends during lifting to scoop earth. British Patent No. 1,059,656 also incorporates a conveyor system into is bed for materials handling and movement. The conveyor system bed of British Patent No. 1,059,656 thus prevents its use with interchangeable beds or modules.

Moehr, U.S. Pat. No. 3,306,478 is another example of a low profile, self loading hauling and dumping vehicle. Kress, U.S. Pat. No. 4,026,430 is a mobile carrier for large scrap steel carrying boxes. Wardle, U.S. Pat. No. 2,795,430 is a carry-all with claw loading scraper apron to assist in loading. Muotka et al., U.S. Pat. No. 3,520,432 utilizes a box frame which requires a blade 4 to rearwardly transport materials to the rear of the bed. Quenzi, U.S. Pat. No. 4,505,638 is another example of a box frame, utilizing a horizontal pair of tracks along which its bucket travels. Wilson, U.S. Pat. No. 3,235,983 is another earth moving apparatus. Galis, U.S. Pat. No. 3,826,387 is a self loading and self-propelled haulage vehicle. Niva, U.S. Pat. No. 4,556,356 is a U-frame truck for handling and transportation of containers or receptacles. Robb, U.S. Pat. No. 2,679,119 discloses an auxiliary scraper and loading apron. Bodine, U.S. Pat. No. 3,030,715 discloses a sonic wave earth digging and moving machine. Trieschmann, U.S. Pat. No. 3,273,732 is a self loading vehicle and dump gate therefore. Le Tourneau, U.S. Pat. No. 1,891,266 discloses a scraper. Lichtenberg, U.S. Pat. No. 2,654,165 discloses a carry-type scraper with front digger moving means. Countryman, U.S. Pat. No. 3,937,345 is a shovel loader with ejector bucket. Shackley, Canadian Pat. No. 681,266 is a vehicle provided with a drag line loader.

Cited for general interest is Cohen, U.S. Pat. No. 4,065,825, and Nishibori, Japan No. 62-125952 showing an all wheel independent steering gear.

Applicant's invention described below eliminates the pulling traction problems, while providing an efficient transport and service vehicle with a centrally located operator station. It has independent wheel drive and suspension which can move laterally, if desired, for greater mobility. Applicant's U-shaped frame multi-purpose vehicle can also nest with one another to enable a number of them to be aligned in a lesser space than conventional vehicle for pulling heavy objects. They also may be interconnected front to back in a formation which insures that the wheels of the trailing vehicles do not follow in the same tracks as the forward vehicles.

SUMMARY OF THE INVENTION

Applicant's invention comprises a universal U-shaped multi-purpose service vehicle having a U-shaped frame. The uni-body U-shaped frame supports and defines the shape of the vehicle, and has opposing sides with fronts ends connected to a front piece, and rear ends defining an open end. The frame may be adapted to accommodate a number of different types of cabins, beds, and mechanisms designed to fit within the space defined by the U-shaped frame. These different cabs, beds, etc. may be removable mounted or permanently attached to the frame, depending upon the desired application.

For use in underground hauling, a digging system component, such as that described in assignee's co-pending application, Ser. No. 359,278 entitled Multi- Purpose Digging and Hauling Vehicle may be mounted within the U-shaped frame. Oscillation means may be associated with the bucket of the digging system component to increase bucket load penetration to assist in loading. As the bucket is oscillated up and down, the material being loaded is also given an up and down motion. Since the amount of vertical displacement is different along the longitudinal axis, there is relative motion between the material particles. This loosens up the material, and reduces the compaction caused by the wedging action of the bucket sides.

The oscillation motion of the bucket also tends to break up any arching formed by the bridging of a few large particles near the throat. The result is a significant reduction in the resistance to bucket penetration. Furthermore, loosened material has a smaller internal angle of friction (angle of repose). For a given pile height of material, the loose material will extend farther into the loading head.

The oscillating method is similar to increasing the slump (low to high) of a concrete mix by addition of water to promote the relative movement between aggregate particles. The oscillated bucket of the digging system component accomplishes the same objectives in a dry muckpile.

The effect of loosening material such as a rock pile through oscillation of the bucket (loading head) was confirmed through extensive field tests showing the depth of penetration and the volume of rock contained with the loading head greatly increased. Because of the increased digging efficiency, the size of the power train required to provide tractive effort is significantly less. As a result, the entire power train energy balance is more efficient, requiring much smaller engines to power digging vehicles.

Towards the rear of the U-frame, a cab is mounted to position the operator to view the vehicle's movement and operations. The cab is sized to accommodate the operator, and includes at least one door opening for the operator to enter and exit the cab.

A plurality of wheels are independently suspended and rotatably attached with wheel mounts to opposing sides of the frame. Various types of conventional pivot means may be attached to the wheel mounts to allow each to pivot and independently turn in a desired direction for independent steering. These pivot means allow each wheel to turn up to 25 degrees in a desired direction.

To provide greater mobility and directional steering latitude, the multi-purpose vehicle generally includes separate independent drive motors and steering means for each wheel. Either electrical or internal combustion engine motors may be utilized, depending upon fuel supply, availability, and cost. These independent drive motors rotate each wheel in a forward or rearward direction, giving the vehicle wide directional steering latitude. The drive motors are operable associated with the wheels via a conventional transmission drive train to rotate the wheels forward or backward. A power source, such as a conventional combustion engine utilizing hydrostatic wheel drive, is mounted on top and towards the rear of the U-frame beneath the cab to operate the pivot means and independent drive motors. Control means mounted to the frame are associated with drive motors and pivot means to selectively activate them to align and drive each wheel and the vehicle at the desired speed and direction.

Preferably the drive motors are preset to run at their optimal efficiency points. A variable speed transmission, such as that described in U.S. Pat. No. 4,856,378, entitled "Variable Speed Transmission", may then be included in the drive train to provide the desired speed and torque to each wheel.

Control means—i.e. a control panel mounted within the cab—are operable associated with the transmission to control the output from the drive motors, and speed of the wheels. The control panel also controls the pivot means to selectively align each wheel in the desired direction.

An auxiliary power such, such as a hydraulic system, may be included, and also controlled by the control panel to selectively operate various components, such as the bucket loader.

In areas with contaminated air, such as in underground mining areas, the multi-purpose vehicle may be operated by remote control. Remote control vehicles are adapted with revolving electronic viewing means, such as a remote control operated camera, capable of receiving and transmitting picture signals. Picture signals are then transmitted to remote receiver viewing screen via a transmitter. A remote vehicle control system in communication with the control panel is then included to enable an operator to transmit signals to position and operate the vehicle from a distance.

A control panel is mounted within the cab to control the handling and loading and unloading of material in a similar manner to that described above.

As adapted, applicant's universal multi-purpose service vehicle is particularly suited for surface transport, loading, and service operations.

DESCRIPTION OF THE ILLUSTRATED EMBODIMENT

Figure 1:
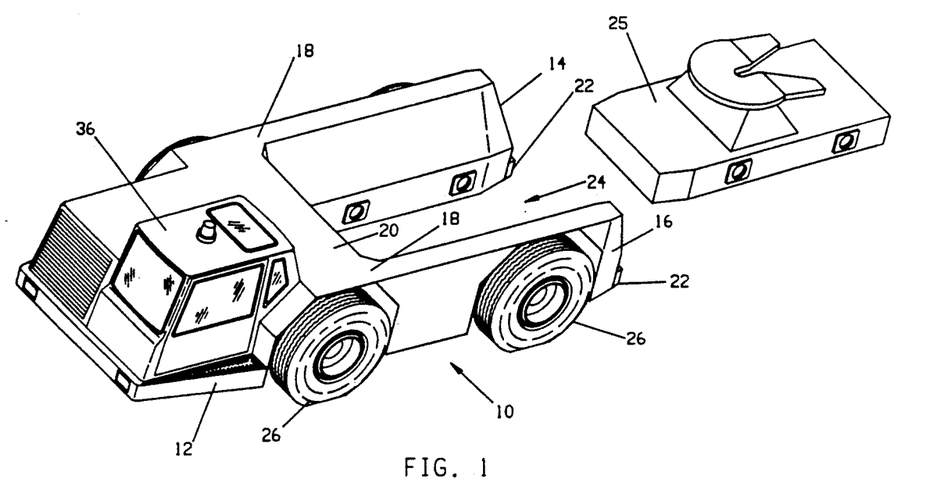
FIG. 1 is a perspective view of a preferred embodiment of applicant's invention.

FIG. 1 illustrates the basic U-shaped multi-purpose service vehicle of applicant's invention 10. The multi-purpose vehicle 10 comprises: a universal uni-body U-shaped frame 12 supporting a defining the shape of the vehicle 10 with opposing sides 14, 16 with front ends 18 connected by a front piece 20. The rear ends 22 of the frame 12 define an open end 24. The open end 24 is of sufficient size and width to accommodate various types of carrying beds and cabins, such as the removable bed mounted fifth wheel module 25 shown in FIG. 1. These various carrying beds, cabins, and modules preferably interchangeable and designed to be removably engaged with locking means, such as hydraulic locks which secure the module to the frame 12.

Figure 2:
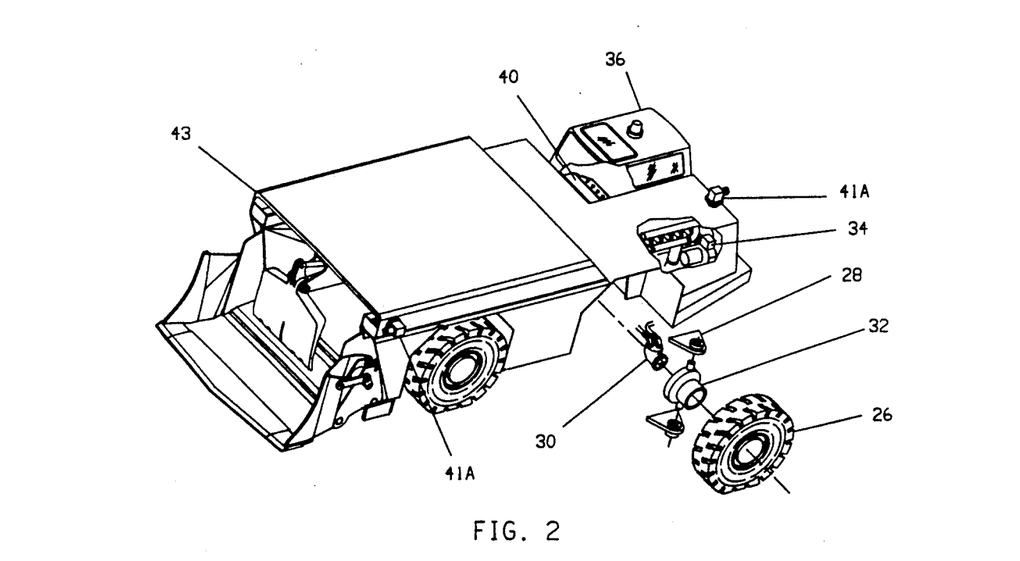
FIG. 2 is a perspective view of another embodiment of applicant's invention.
Figure 2A:
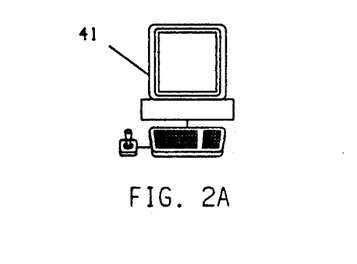
FIG. 2a is a perspective view of a remove control center.

A plurality of wheels 26 are independently suspended and rotatably attached with pivoting wheel mounts 28 shown in FIG. 2 to the opposing sides 14, 16 of the frame 12 to independently pivot and turn each wheel 26 for independent steering. Each wheel 26 is associated with an independent drive motor 30 to independently drive said wheels 26 in a forward or rearward direction. A hydrostatic wheel drive 32 is associated with drive motors to prove the desired speed and torque outputs. A power source 34, such as an internal combustion engine, operates the pivot means and independent drive means. A cab 36 mounted towards the front of the frame 12 has a control panel 40 to selectively activate the drive means and pivot means to drive the vehicle. A digging and hauling module discussed below is mounted within the U-shaped frame 12, and generally covered with a cover 43 when contaminated materials are transported. Where contaminated air systems are encountered, this embodiment is adapted to be operated remotely from a remote control center 41 shown in FIG. 2, by an operator responding to pictures sent by a camera 41a mounted on the vehicle 10.

Figure 3:
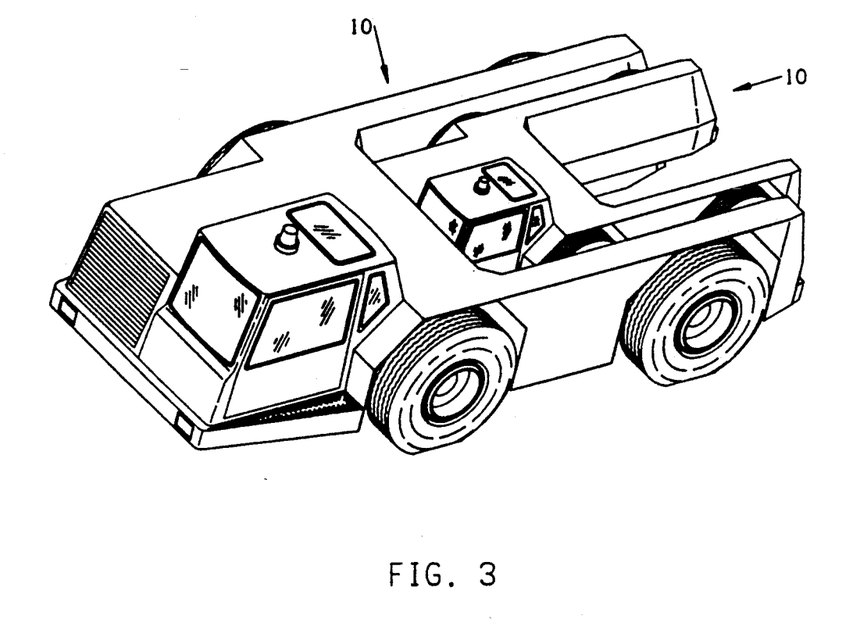
FIG. 3 is a perspective view of two nested preferred embodiments of applicant's invention shown in FIG. 1.

FIG. 3 is a perspective view of two nested embodiments of applicant's invention 10 shown in FIG. 1 to provided increased pulling capacity in a shorter span, and insuring that the wheels of the following vehicle do not travel in the same tracks as the leading vehicle.

Figure 4:
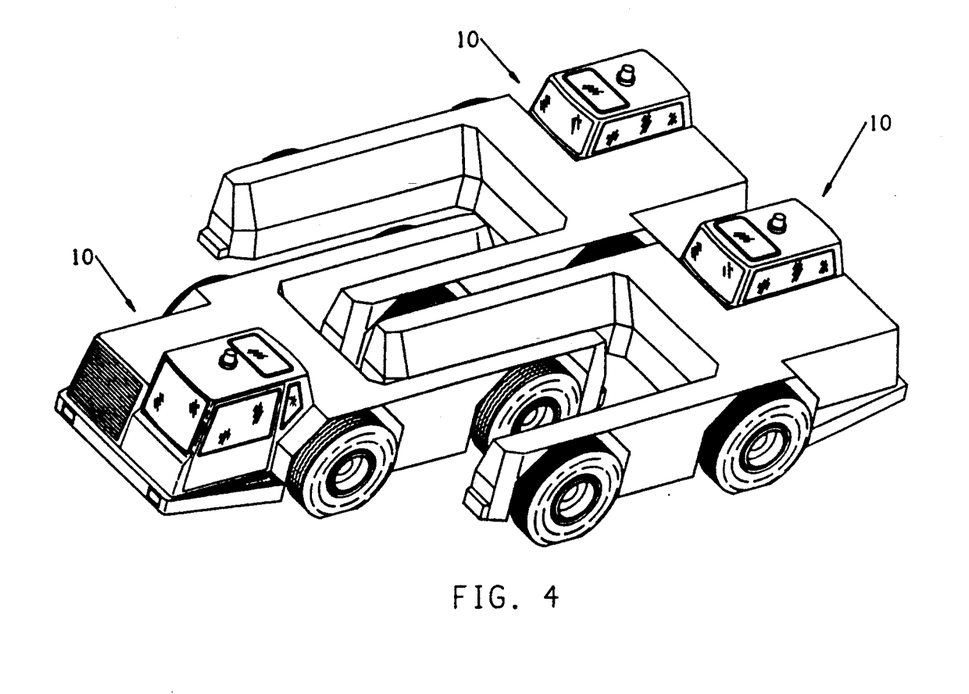
FIG. 4 is a perspective view of three interlocked embodiments of applicant's invention shown in FIG. 1.

FIG. 4 is a perspective view of three interlocked embodiments of applicant's invention 10 shown in FIG. 1, again providing increased pulling capacity in a shorter span, and insuring that the wheels of the following vehicle do not travel in the same tracks as the leading vehicle.

Figure 5:
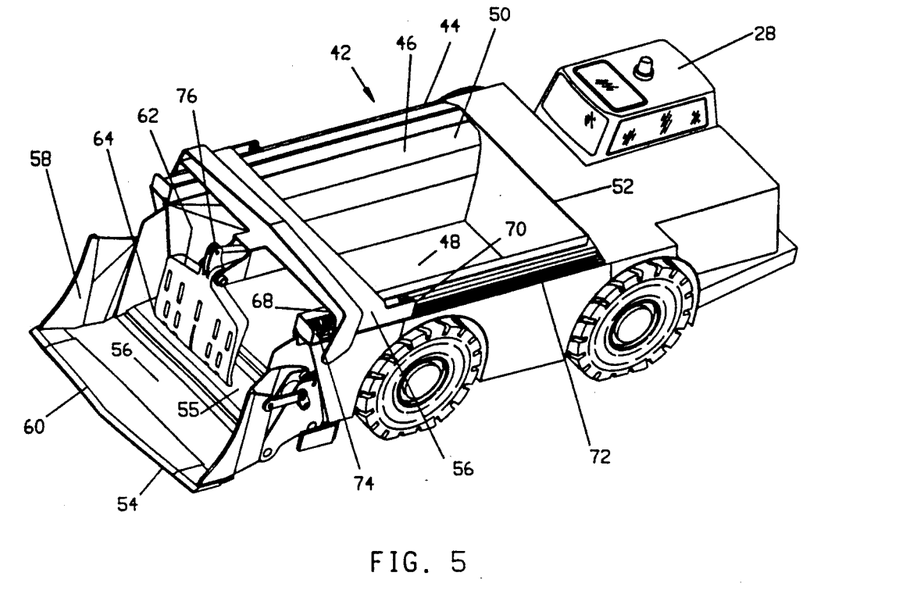
FIG. 5 illustrates a perspective view of the preferred embodiment of applicant's invention shown in FIG. 1 adapted as a gully cleaning system vehicle.

FIG. 5 illustrates basic U-shaped multi-purpose vehicle 10 shown in FIG. 1 adapted with a gully cleaning system 42. A U-shaped bucket load chamber 44 having opposing sides 46 attached to a bed 48 is tiltably attached to the drive frame 12. The rear bucket load chamber side ends 50 are connected by a back piece 52 to form an open topped U-shaped chamber 44 having a frontal opening 55 leading into an interior load carrying space of the bucket load chamber 44. Preferably, the chamber sides 46 and the back piece 52 are sloped to aid in emptying loads from the bucket load chamber 44, when tilted.

A bucket loader 54 is attached to the sides 46 of the bucket load chamber 44 with transfer means to transfer the contents of the bucket loader 54 into the bucket load chamber 44. The bucket loader has a bottom 56 and opposing sides 58 defining an open topped scoop with open ends. The digging lip 60 of the bucket loader bottom 56 is sharpened to dig and scoop earth, ore, and the like. The sides 58 define a narrowing open bucket loader form front to back to concentrate materials as they are scooped up and forced rearward by the digging lip 60 for discharge into and through the open front end 55 of the bucket load chamber 44. Oscillation means, such as an hydraulic piston or rocker system (not shown), are generally incorporated to provide up to a plus or minus three inch vertical displacement of the digging lip 60 of the bucket loader 54 as it pivots. The frequency of the bucket oscillations is designed to generate from ½ to up to 5 cycles per second. In the field, the operator may manually adjust the frequency and amplitude of the bucket as well as its forward thrust to overcome the resistance of the materials being loaded. Alternatively, an automated self adjusting control system utilizing various mechanical, electrical, and hydraulic means may be built into the hydraulic system to automatically increase the frequency and amplitude of the bucket oscillations and the forward movement of the digging lip 60 to provide the desired materials penetration.

A drag arm 62 the width of the front end opening 55 of the bucket load chamber 44 is pivotally and slideably mounted along the top of the bucket load chamber 44 to assist in emptyying the bucket loader 54 to drag large objects from the bucket loader 54 into the bucket load chamber 44. The drag arm 62 has fingers 64 which extend the approximate height of the bucket load chamber front end opening 55. The drag arm 62 is pivotally associated with a pair of slides 66 having first and second ends 68,70. The slides 66 run along longitudinal parallel top grooves 72 in the exterior sides 46 of the bucket load chamber 44. An hydraulic piston 74 is mounted on each slide 66, with one end secured to the second end 70 of the slide 66 and the other end secured to a rocker 76 attached to the end of the drag arm 62. The drag arm 62 and fingers 64 are selectively tilted up and down by the operation of the hydraulic piston 74. A second drive piston (not shown) is mounted along the top sides 46 of the bucket load chamber 44 to selectively move the slides 66 forward and rearward along the top grooves 72 to extend and retract the drag arm 62.

To move and position the drag arm 62, the pistons 74 are selectively activated by the control panel in the cab 28. The bucket loader 54, may also be simultaneously partially raised and angled to provide gravity assistance in emptyying the bucket loader 54.

To dump the bucket loading chamber 44, a dump cylinder (not shown) with one end attached to the U-frame 16 and the other end attached to the bottom of the bucket load chamber bed 48 selectively raises and tilts the bucket load chamber 44 to the dump position. In the first mode, the dumping cylinder selectively lifts and vertically tilts the bottom of the bucket load chamber 44 to unload said chamber through the open front end 60 of the bucket loader 54. After emptyying, the dump cylinder then lowers the bucket load chamber 44 for re-filling.

Figure 6:
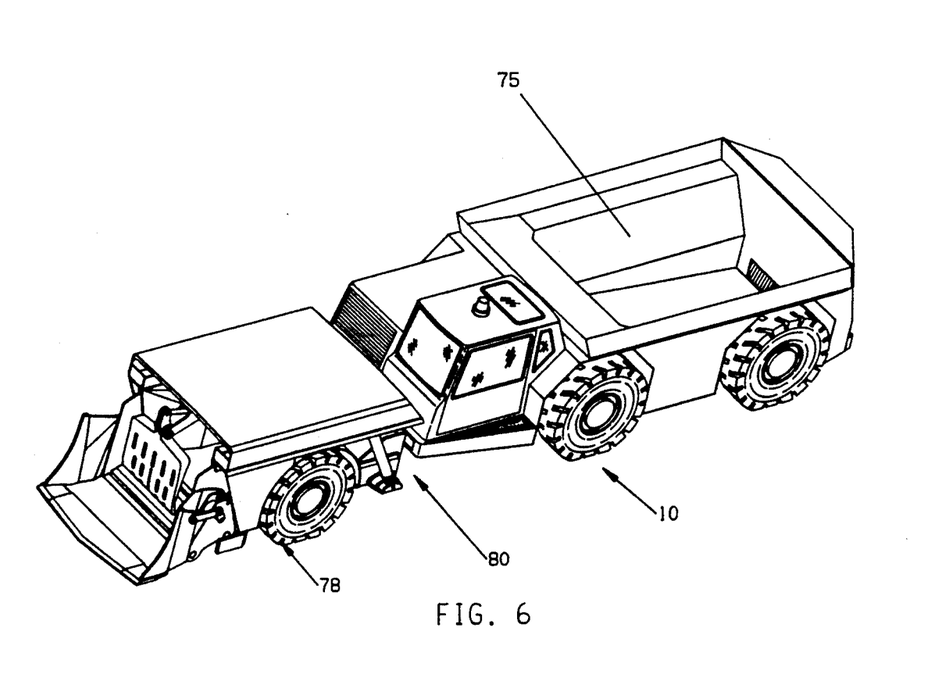
FIG. 6 is a perspective view of the preferred embodiment of applicant's invention shown in FIG. 1 associated with a digging system component.

FIG. 6 illustrates the embodiment of the vehicle 10 shown in FIG. 1 with an earthmover carrying bed module 75 mounted within the U-frame 16. Attached to the front of vehicle 10 with a hinged articulated joint 80 (not shown) is a gully cleaning system 42 similar to that shown in FIG. 5 with its own wheel system 78. The combined length of the vehicle 10 with gully cleaning system 42 is longer than its combined width and height. This enables the vehicle 10 with gully cleaning system 42 to work in confined spaces such as in underground mines.

Figure 7:
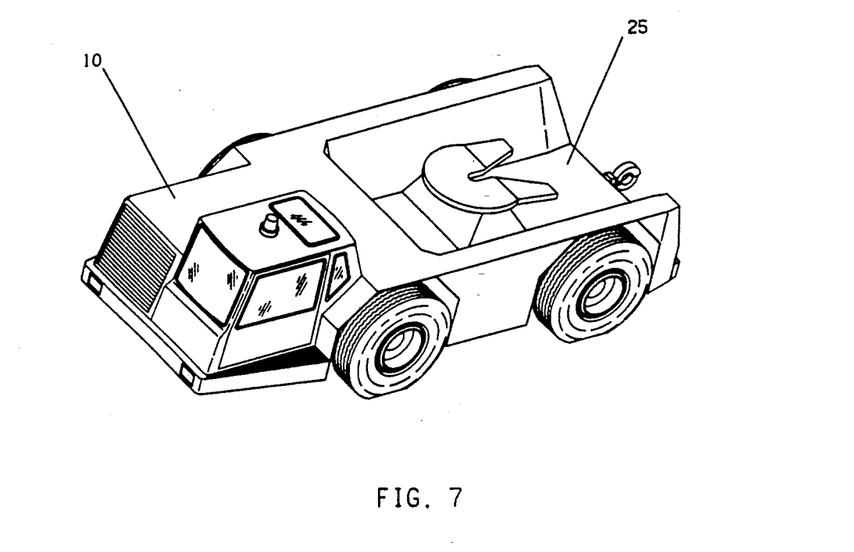
FIG. 7 illustrates a perspective view of a preferred embodiment of applicant'invention adapted with a fifth wheel mount.

FIG. 7 illustrates a perspective view of a preferred embodiment of applicant's invention adapted with a fifth wheel mount 25 mounted within the open space of the U-shaped frame 16.

Figure 8:
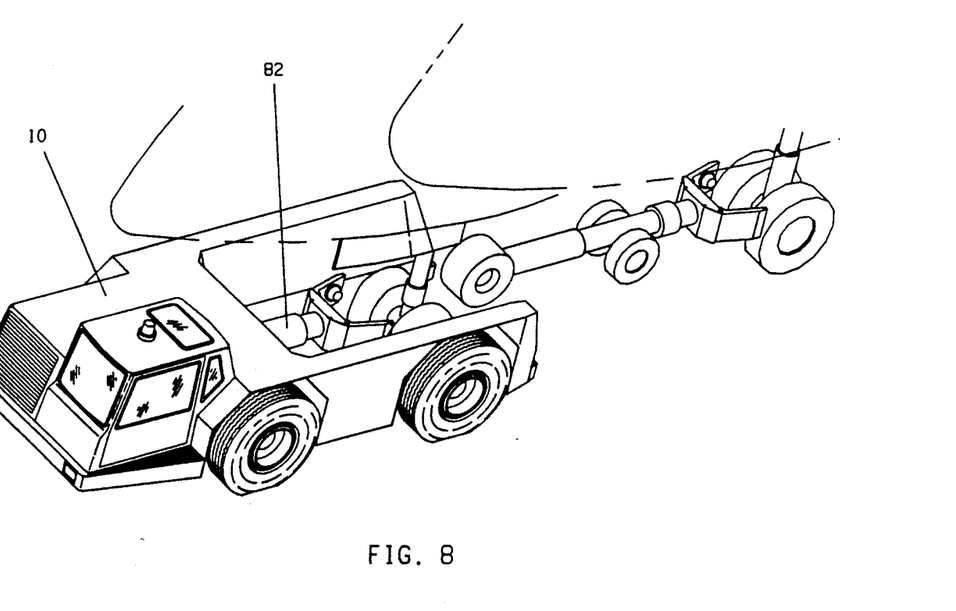
FIG. 8 illustrates a perspective view of a preferred embodiment of applicant'invention adapted with a pulling mount for aircraft.

FIG. 8 illustrates a perspective view of a preferred embodiment of applicant's invention adapted with a pulling mount (aircraft tug module) 82 for aircraft mounted within the open space of the U-shaped frame 16.

Figure 9:
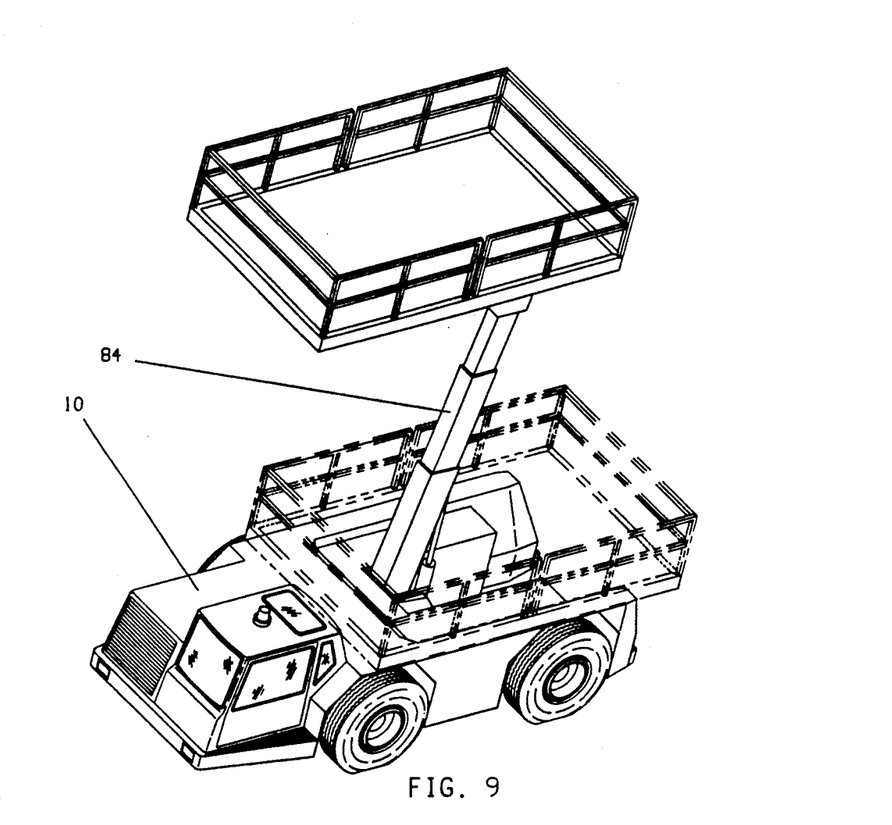
FIG. 9 illustrates a perspective view of a preferred embodiment of applicant'invention adapted with a high reach boom and work platform.

FIG. 9 illustrates a perspective view of a preferred embodiment of applicant's invention adapted with a telescopic high reach boom and work platform 84 mounted within the open space of the U-shaped frame 16.

Figure 10:
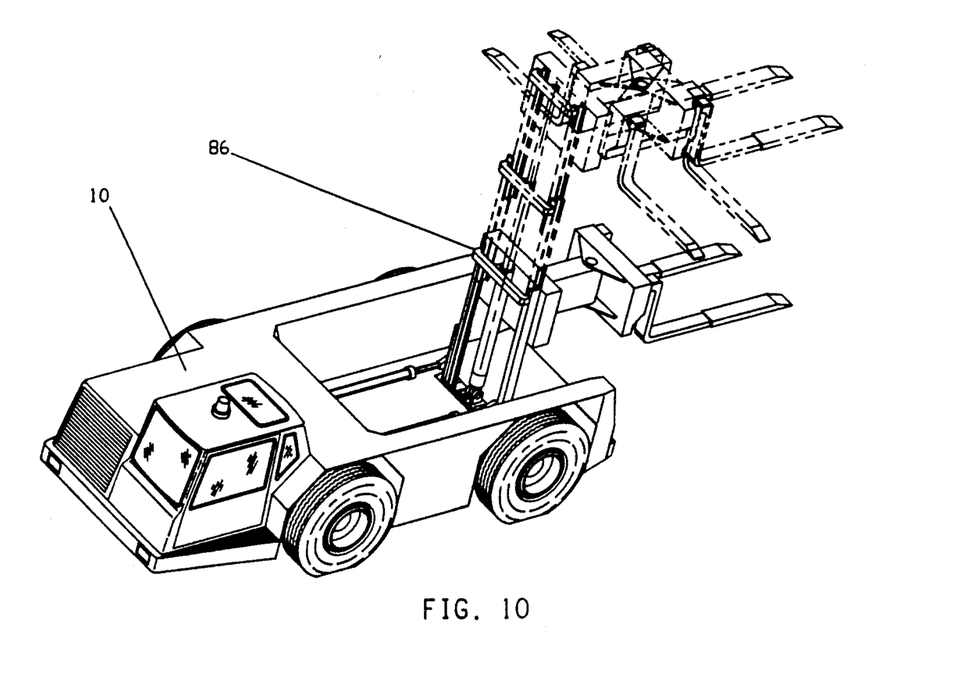
FIG. 10 illustrates a perspective view of a preferred embodiment of applicant'invention adapted with a forklift.

FIG. 10 illustrates a perspective view of a preferred embodiment of applicant's invention adapted with a bed mounted rotated forklift module 86 mounted within the open space of the U-shaped frame 16.

Figure 11:
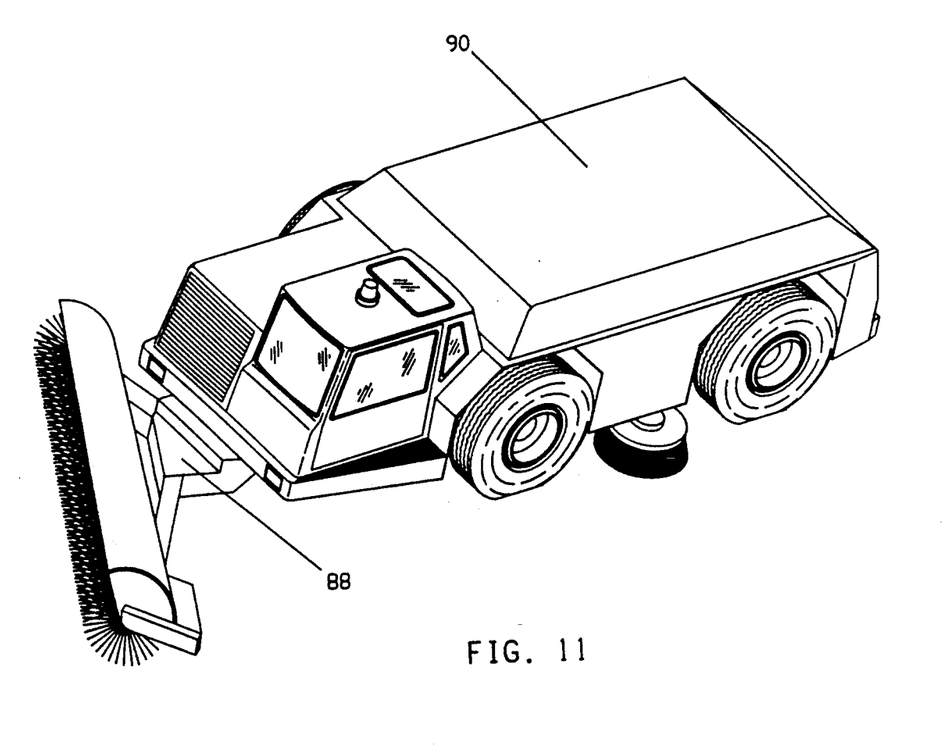
FIG. 11 illustrates a perspective view of a preferred embodiment of applicant'invention adapted with a front-mounted sweep.

FIG. 11 illustrates a perspective view of a preferred embodiment of applicant's invention adapted with a front-mounted sweeper 88 and a rear mounted liquid carrying tank module 90 mounted within the open space of the U-shaped frame 16 to aid in sweeping and cleaning.

Figure 12:
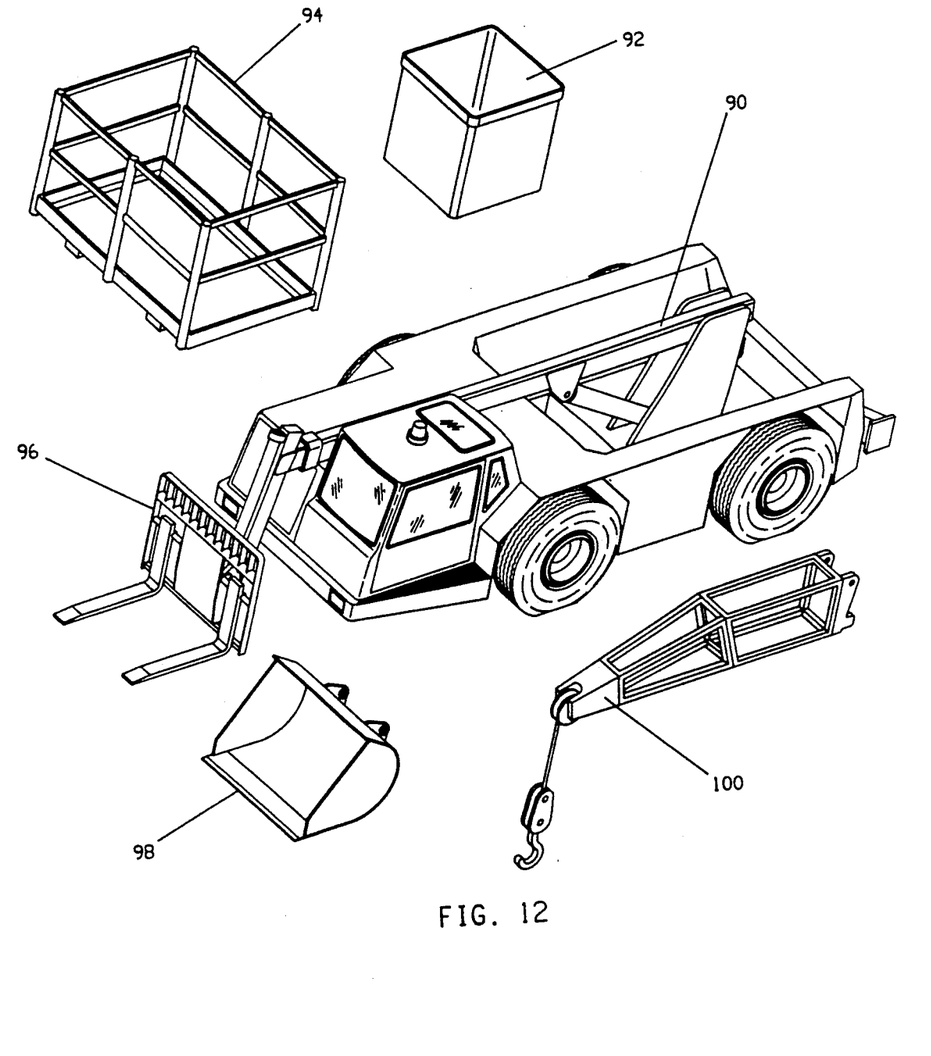
FIG. 12 illustrates a perspective view of a preferred embodiment of applicant'invention adapted with a universal hoist crane module with interchangeable attachments.

FIG. 12 illustrates a perspective view of a preferred embodiment of applicant's invention adapted with a universal hoist crane for use with interchangeable attachments, such as a personnel basket 92, a work platform 94, a forklift 96, a loader bucket 98, and a crane 100.

Applicant's invention thus provides a universal vehicle 10 with a basis chassis having a common interface to a number of interchangeable service modules which can be removably or permanently secured within the interior space of the U-shaped frame 16.

Although this specification has made reference to the specific embodiments, it is not intended to restrict the scope of the appended claims. The claims themselves recite those features deemed essential to the invention.

I claim:

1. A U-shaped multi-purpose vehicle pulling and carrying system comprising: a plurality of multi-purpose vehicles each respectively having:
   a. a U-shaped frame supporting and defining the shape of the vehicle, with opposing sides and rear ends connected by a back piece, and front ends defining an open interior space in communication with an open front end of sufficient size to accommodate the respective rear ends of a corresponding U-shaped frame when inserted within the respective interior spaces of a corresponding second multi-purpose vehicle,
   b. wheel mounts capable of pivoting attached to the opposing sides,
   c. a plurality of wheels independently suspended and rotatably attached to the wheel mounts,
   d. pivot means associated with the wheel mounts to pivot and turn each wheel in a desired direction,
   e. independent drive means associated with each wheel to rotate said wheels forward and backward,
   f. a power source to operate the pivot means and independent drive means, and
   g. control means mounted to the frame and associated with the drive means, and pivot means to selectively activate the drive means and pivot means to align and drive each wheel at the desired speed and direction;
   with their U-shaped frames interconnected for pulling and carrying articles.

2. A U-shaped multi-purpose vehicle pulling and carrying system comprising: a plurality of multi-purpose vehicles each respectively having:
   a. a U-shaped frame supporting and defining the shape of the vehicle, with opposing sides and rear ends connected by a back piece, and front ends defining an open interior space in communication with an open front end of sufficient size to accommodate a second smaller multi-purpose vehicle,
   b. wheel mounts capable of pivoting attached to the opposing sides,
   c. a plurality of wheels independently suspended and rotatably attached to the wheel mounts,
   d. pivot means associated with the wheel mounts to pivot and turn each wheel in a desired direction,
   e. independent drive means associated with each wheel to rotate said wheels forward and backward,
   f. a power source to operate the pivot means and independent drive means, and
   g. control means mounted to the frame and associated with the drive means, and pivot means to selectively activate the drive means and pivot means to align and drive each wheel at the desired speed and direction;
   wherein the vehicles are progressively sized and structured to allow the smaller U-shaped vehicle to nest within the space defined by the U-shaped frame of the larger U-shaped vehicles.

3. A U-shaped multi-purpose vehicle system comprising a plurality of multi-purpose vehicles each comprising:
   a. a uni-body U-shaped frame supporting and defining the shape of the vehicle, with opposing sides and rear ends connected by a back piece, and front ends defining an open interior space in communication with an open front end of sufficient size to accommodate respective rear ends of a corresponding U-shaped multi-purpose service vehicle's uni-body U-shaped frame when inserted within an interior space of a corresponding interior space of multi-purpose vehicle, said U-shaped frame further including frame structure to secure to the U-shaped frame within the interior space a plurality of loads,
   b. wheel mounts capable of pivoting attached to the opposing sides,
   c. a plurality of wheels independently suspended and rotatably attached to the wheel mounts,
   d. pivot means associated with the wheel mounts to pivot and turn each wheel in a desired direction,
   e. independent drive means associated with each wheel to rotate said wheels forward and backward,
   f. a power source to operate the pivot means and independent drive means, and
   g. control means mounted to the frame and associated with the drive means, and pivot means to selectively activate the drive means and pivot means to align and drive each wheel at a desired speed and direction.

4. A U-shaped multi-purpose vehicle system according to claim 3, wherein the frame structure enables a plurality of loads to be interchangeably mounted within the opening of the U-shaped frame.

5. A U-shaped multi-purpose vehicle system according to claim 3, including a cab attached to the back piece of the frame, sized to accommodate an operator and the control means, and having at least one door through which an operator may enter and exit the cab, and at least one window through which the operator may view the environs surrounding the vehicle.

6. A U-shaped multi-purpose vehicle system according to claim 3, including:
rotatably mounted electronic viewing means capable of receiving and transmitting picture signals attached to the frame and an electrical contact with a remote receiving viewing screen, and
a remote control in communication with the control means to enable an operator to position the vehicle in the desired position.

7. A U-shaped multi-purpose vehicle system according to claim 3, wherein the drive means and power source comprises at least one internal combustion engine having a fuel supply operably associated with each wheel.

8. A U-shaped multi-purpose vehicle system according to claim 3, wherein the drive means and the power source comprise at least one electric motor having an electricity supply operably associated with each wheel.

9. A U-shaped multi-purpose vehicle system according to claim 3, including coupling means attached to the rear ends of the U-frame for pulling articles.

10. A U-shaped multi-purpose vehicle system according to claim 3, including an earthmover carrying bed module secured to the frame structure within the interior space of the U-shaped frame.

11. A U-shaped multi-purpose vehicle system according to claim 3, including a boom mounted utility module adapted to accommodate interchangeable attachments secured to the frame structure.

12. A U-shaped multi-purpose vehicle system according to claim 3, including a liquid carrying tank mounted on the frame structure within the interior space of the U-shaped frame for transporting liquids.

13. A U-shaped multi-purpose vehicle system according to claim 3, including a telescopic work platform system module mounted to the frame structure within the interior space of the U-shaped frame.

14. A U-shaped multi-purpose vehicle system according to claim 3, including a fifth wheel module system mounted to the frame structure within the interior space of the U-shaped frame.

15. A U-shaped multi-purpose vehicle system according to claim 3, including an aircraft tube module system mounted to the frame structure within the interior space of the U-shaped frame.

16. A U-shaped multi-purpose vehicle system according to claim 3, including a bed mounted rotating fork lift module system mounted to the frame structure within the interior space of the U-shaped frame.

* * * * *